(12) United States Patent
Datta et al.

(10) Patent No.: US 7,200,772 B2
(45) Date of Patent: Apr. 3, 2007

(54) METHODS AND APPARATUS TO REINITIATE FAILED PROCESSORS IN MULTIPLE-PROCESSOR SYSTEMS

(75) Inventors: Sham Datta, Hillsboro, OR (US); Vincent Zimmer, Federal Way, WA (US); Michael Rothman, Gig Harbor, WA (US); Andy Miga, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 10/425,805

(22) Filed: Apr. 29, 2003

(65) Prior Publication Data

US 2004/0221196 A1    Nov. 4, 2004

(51) Int. Cl.
*G06F 11/00* (2006.01)
(52) U.S. Cl. .............................. 714/13; 714/11; 714/12
(58) Field of Classification Search ................... 714/11, 714/12, 13
See application file for complete search history.

(56) References Cited

U.S. PATENT DOCUMENTS

| | | | | |
|---|---|---|---|---|
| 5,784,549 A | * | 7/1998 | Reynolds et al. | 714/24 |
| 6,161,196 A | * | 12/2000 | Tsai | 714/10 |
| 6,687,791 B2 | * | 2/2004 | Morrison | 711/130 |
| 6,889,167 B2 | * | 5/2005 | Curry, III | 702/183 |
| 2002/0174381 A1 | * | 11/2002 | Olarig et al. | 714/25 |

* cited by examiner

*Primary Examiner*—Scott Baderman
*Assistant Examiner*—Joshua Lohn
(74) *Attorney, Agent, or Firm*—Hanley, Flight & Zimmerman, LLC

(57) ABSTRACT

Methods and apparatus to reinitiate failed processors in multiple-processor systems are described herein. In an example method, a failure associated with a first processor of a plurality of processors in a multiple-processor system is detected by a second processor of the plurality of processors. In response to detection of the failure associated with the first processor, the second processor restores the first processor.

34 Claims, 4 Drawing Sheets

| INITIALIZATION TASK (310) | ASSIGNED AP | COMPLETION SIGNAL (320) |
|---|---|---|
| #1 | 220 | NO |
| #2 | 230 | YES |
| #3 | 240 | YES |
| #4 | 230 | YES |

120

120

| INITIALIZATION TASK (310) | ASSIGNED AP | COMPLETION SIGNAL (320) |
|---|---|---|
| #1 | 220 | NO |
| #2 | 230 | YES |
| #3 | 240 | YES |
| #4 | 230 | YES |

METHODS AND APPARATUS TO REINITIATE FAILED PROCESSORS IN MULTIPLE-PROCESSOR SYSTEMS

TECHNICAL FIELD

The present disclosure relates generally to processor systems, and more particularly, to methods and apparatus to reinitiate failed processors in multiple-processor systems.

BACKGROUND

In an effort to improve performance by increasing computational power, many computing systems are turning to multiple-processor systems. A multiple-processor system typically includes a plurality of processors, a plurality of associated caches, and a main memory. Following a power-up or reset of the multiple-processor system, one of the plurality of processors is selected as a boot strap processor (BSP) and the remaining processors are designated as auxiliary processors (AP). The BSP is configured to execute the boot strap code of the basis input/output system (BIOS) to configure the advanced programmable interrupt controller (APIC) environment, to set up system-wide data structures, and to start and initialize the APs. The APs perform time consuming tasks to free up the BSP, which, in turn, results in faster execution time for the overall system.

During boot time of the multiple-processor system, the BSP dispatches a request to an AP to perform an initialization task such as testing a memory, initializing hardware, and/or other tasks to boot the multiple-processor system. The BSP waits for a status reply from the AP to indicate that the AP has completed the initialization task. However, the AP may hang (i.e., fail to complete the initialization task) for a number of reasons. For example, the AP may crash or get stuck in an infinite loop during execution of an initialization task, such as testing the memory of the multiple-processor system. Accordingly, the BSP may not receive a reply from the AP. As a result, the entire multiple-processor system hangs because the BSP fails to complete the boot process because the BSP is waiting for a reply that the AP will not transmit.

BRIEF DESCRIPTION OF THE DRAWINGS

FIG. 3 is a block diagram representation of a table associated with initialization tasks.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
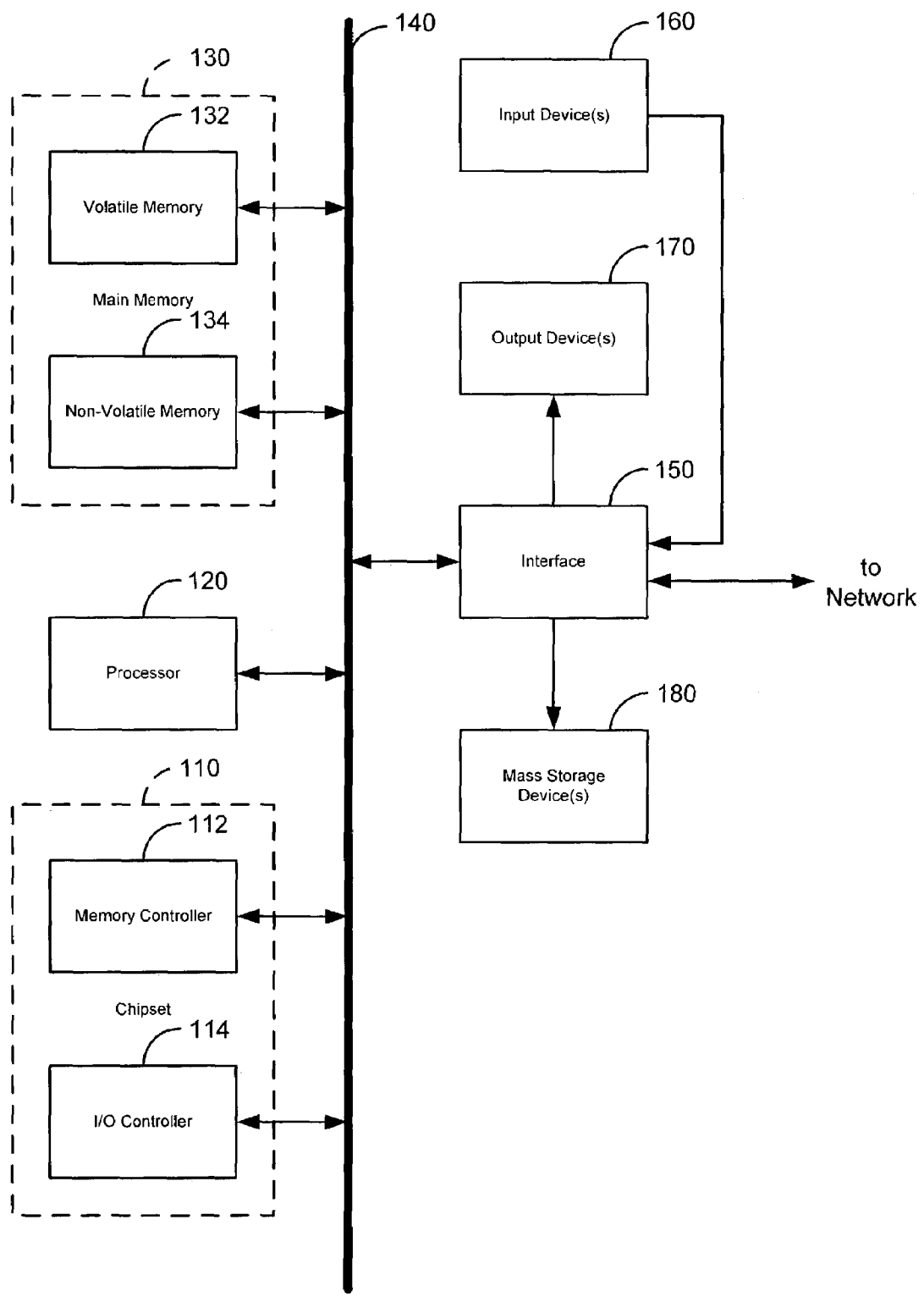
FIG. 1 is a block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance or any other type of computing device.

The processor system 100 illustrated in FIG. 1 includes a chipset 110, which includes a memory controller 112 and an input/output (I/O) controller 114. As is well known, a chipset typically provides memory and I/O management functions, as well as a plurality of general purpose and/or special purpose registers, timers, etc. that are accessible or used by a processor 120. The processor 120 is implemented using one or more in-order processors. For example, the processor 120 may be implemented using one or more of the Intel® Pentium® family of microprocessors, the Intel® Itanium® family of microprocessors, and/or the Intel XScale® family of processors. In the alternative, other processors or families of processors may be used to implement the processor 120.

As is conventional, the memory controller 112 performs functions that enable the processor 120 to access and communicate with a main memory 130 including a volatile memory 132 and a non-volatile memory 134 via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented using flash memory, Read Only Memory (ROM), Electrically Erasable Programmable Read Only Memory (EEPROM), and/or any other desired type of memory device.

The processor system 100 also includes a conventional interface circuit 150 that is coupled to the bus 140. The interface circuit 150 may be implemented using any type of well known interface standard such as an Ethernet interface, a universal serial bus (USB), a third generation input/output interface (3GIO) interface, and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes, among other things, a graphics driver card.

The processor system 100 also includes one or more mass storage devices 180 configured to store software and data. Examples of such mass storage device(s) 180 include floppy disks and drives, hard disk drives, compact disks and drives, and digital versatile disks (DVD) and drives.

The interface circuit 150 also includes a communication device such as a modem or a network interface card to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180 and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
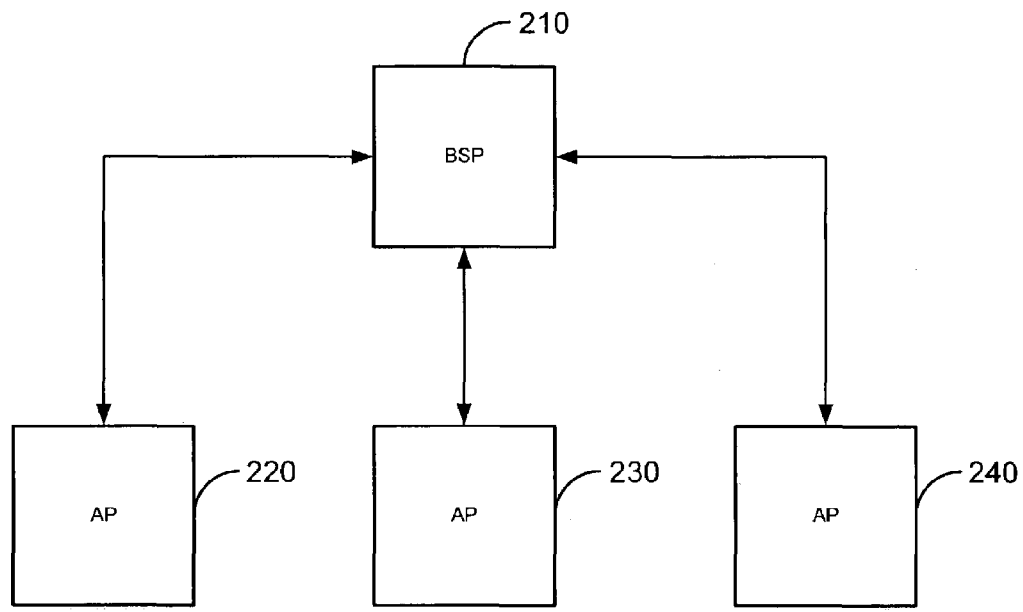
FIG. 2 is a block diagram representation of an example multiple-processor system.

The processor system 100 may be a multiple-processor system such that the processor 120 may be implemented by one or more processors as noted above. In the example of FIG. 2, the illustrated processor 120 includes a plurality of processors generally shown as references numerals 210, 220, 230, and 240. For example, each of the plurality of processors may be implemented by one or more of the Intel® Pentium® family of microprocessors, the Intel® Itanium® family of microprocessors, the Intel XScale® family of processors, and/or any other processors or families of processors. The processors 210, 220, 230, and 240 are operatively coupled to each other directly and/or via a bus.

Following a power-up or reset of the processor system 100, one of the plurality of processors is selected as a boot strap processor (BSP) and the remaining processors are designated as auxiliary processors (APs) in a conventional manner. For example, processor 210 may be selected as the BSP while processors 220, 230, and 240 are designated as APs. The BSP 210 may execute the boot strap code of the basic input/output system (BIOS) to configure the advanced programmable interrupt controller (APIC), to set up system-wide data structures, and/or to start and initialize the APs 220, 230, 240. The APs 220, 230, 240 may perform initialization tasks assigned by BSP 210. For example, the initialization tasks may include testing the memory 130, initializing hardware such as input device(s) 160, output device(s) 170, and/or mass storage device(s) 180, and/or any other tasks to boot the processor system 100.

The BSP 210 may assign initialization tasks to one or more of the APs based on operating parameters of the APs such as availability, processing speed, etc. To keep track of the assigned initialization tasks, the BSP 210 maintains a table and/or other data structure stored in the main memory 130, the mass storage device 180 and/or type of memory device. In the example of FIG. 3, the illustrated table 300 includes a first column 310 and a second column 320. The first column 310 indicates the AP assigned to each initialization task. For example, the AP 220 is assigned to execute initialization task #1, the AP 230 is assigned to execute initialization tasks #2 and #4, and the AP 240 is assigned to execute the initialization task #3 as shown in the first column 310. The second column 320 indicates whether the BSP 210 has received a completion signal from the assigned AP listed in the first column 310.

In general, to increase system reliability, the BSP 210 monitors for a failure associated with any of the APs 220, 230, 240 after dispatching the requests associated with initialization tasks to initialize the processor system 100. That is, the BSP 210 determines whether any of the APs 220, 230, 240 has failed to execute an initialization task requested by the BSP 210 because of a hang condition (e.g., lack of processing capabilities to perform the initialization task), and/or a hardware failure (e.g., a connection failure and/or a power failure). Typically, the BSP 210 receives a completion signal from each of the APs 220, 230, 240 when the APs 220, 230, 240 complete their corresponding initialization tasks. As illustrated in FIG. 3, for example, the BSP 210 received completion signals from APs 230 and 240 but not from AP 220.

Figure 4:
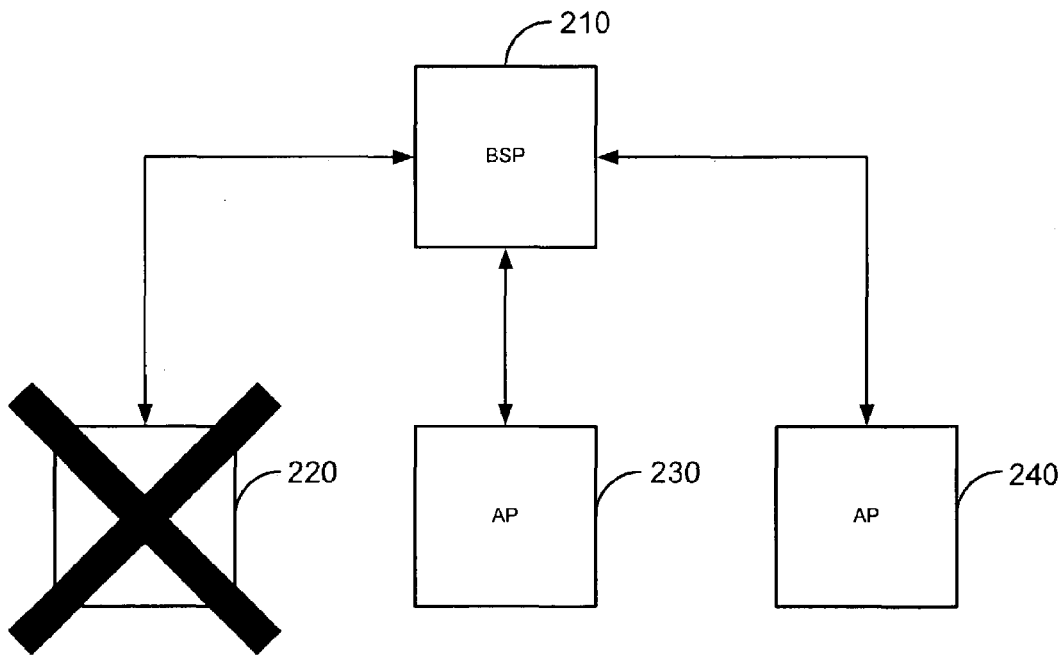
FIG. 4 is a block diagram representation of an example multiple-processor system having a failed processor.

In the example of FIG. 4, the AP 220 failed to execute an initialization task assigned by the BSP 210 (e.g., the initialization task #1 in FIG. 3). For example, a hang condition associated with the AP 220 may occur because the AP 220 crashed and/or is stuck in a loop associated with the assigned initialization task. Because of the hang condition, the AP 220 fails to transmit a completion signal to the BSP 210 as shown in FIG. 3. To restore (i.e., reset) the AP 220, the BSP 210 transmits a reset signal to the AP 220. Thus, the AP 220 is reinitiated by the BSP 210. The BSP 210 may reassign the initialization task to another AP. To diagnose and/or avoid future hang conditions, the BSP 210 may enter the initialization task in an initialization log avoid future hang conditions.

Figure 5:
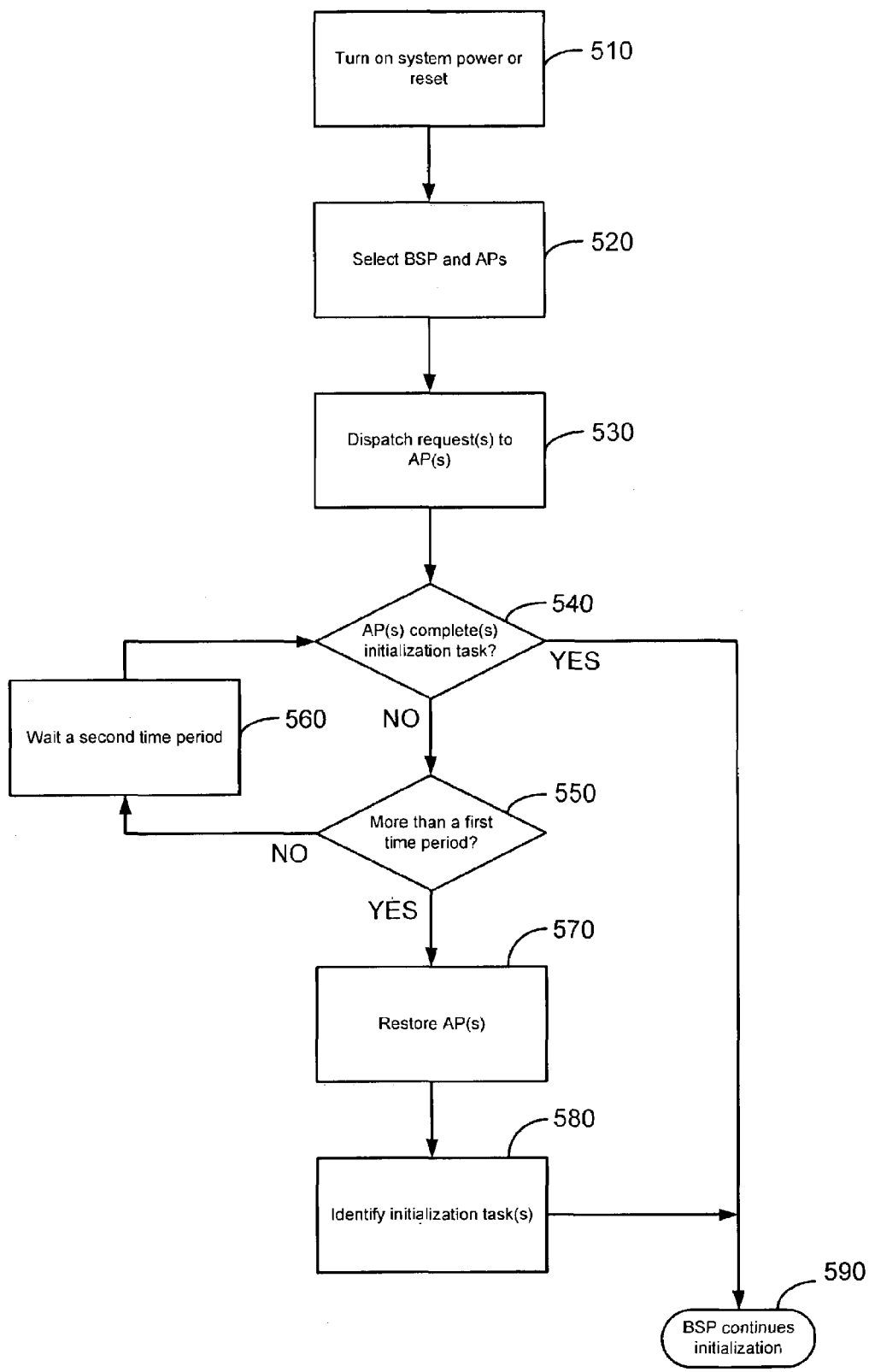
FIG. 5 is a flow diagram representation of example machine readable instructions that may reinitiate failed processors in multiple-processor systems.

Machine readable instructions that may be executed by the processor system 100 to reinitiate a failed processor such as AP 220 are illustrated in FIG. 5. Persons of ordinary skill in the art will appreciate that the instructions can be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of steps is illustrated in FIG. 5, persons of ordinary skill in the art will appreciate that these steps can be performed in other temporal sequences. Again, the flow chart 500 is merely provided as an example of one way to program the processor system 100 to reinitiate failed processors.

In the example of FIG. 5, the processor system 100 is powered up (block 510), and one of the plurality of processors in the processor system 100 is selected as the BSP (e.g., the processor 210) while the remaining processors are designated as APs (e.g., processors 220, 230, and 240) (block 520). The BSP 210 dispatches requests associated with initialization tasks to the APs 220, 230, 240 (block 530) so that the APs 220, 230, 240 may perform initialization tasks to free up the BSP 210 to perform other tasks. For example, the BSP 210 may dispatch requests to the APs 220, 230, 240 to test a memory associated with the processor system 100, and/or to initialize hardware associated with the processor system 100 such as a keyboard and/or a disk drive.

After dispatching initialization requests to the APs 220, 230, 240, the BSP 210 determines whether the APs 220, 230, 240 completed the dispatched initialization tasks (block 540). In particular, the BSP 210 monitors for completion signals from the APs 220, 230, 240, which are indicative of the APs 220, 230, 240 completing the initialization tasks requested by the BSP 210. For example, if APs 230, 240 completed their initialization tasks, the BSP 210 receives completion signals from each of those APs 230, 240. Each completion signal indicates that the corresponding AP 230, 240 has completed its initialization tasks to the BSP 210, which, in turn, continues to initialize the processor system 100 (block 590). Otherwise, the BSP 210 determines whether a first time period has elapsed since the request was dispatched to the APs 220, 230, 240 (block 550).

If the first time period has not elapsed, then the BSP 210 waits for a second time period before proceeding back to block 540 to operate as described above (block 560). On the other hand, if the BSP 210 fails to receive a completion signal from an AP (e.g., AP 220) then the BSP 210 declares a hang condition associated with that AP. That is, the AP 220 failed to complete its initialization task prior to expiration of the first time period.

Upon detecting that the AP 220 has failed its execution, the BSP 210 restores (i.e., resets) the AP 220 (block 570). In particular, the BSP 210 transmits a reset signal (e.g., an inter-processor interrupt (IPI) signal) to instruct the AP 220 to restart. To diagnose and avoid future hang conditions to any of the APs 220, 230, 240, the BSP 210 identifies and logs the initialization task that caused the hang condition to the AP 220 (block 580). The BSP 210 may store information associated with the initialization task in an initialization log so that the processor system 100 may bypass or alert the user of that problem in the future. The BSP 210 may also initiate a test for hardware failure on the AP 220 to determine if a hardware failure caused the hang condition. After identifying the initialization task, the BSP 210 continues with the initialization of the multiple-processor system 100 (block 590). Based on the initialization log, the BSP 210 may reassign the initialization task to another AP if the initialization task had no previous problem. As a result, the processor system 100 may reinitiate its own processors.

While the example processor system 100 illustrated in FIGS. 2 and 4 is depicted with four processors, the processor system 100 may be any processor system implemented with two or more processors without departing from the scope or spirit thereof. For example, the processor system 100 may be a low-end, dual-processor (DP) system.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to reinitiate failed processors in multiple-processor systems comprising:
    detecting a failure associated with a first processor of a plurality of processors in the multiple-processor system by a second processor of the plurality of processors during initialization of the multiple-processor system;
    identifying an initialization task that caused the failure associated with the first processor by the second processor;
    adding the initialization task to a list to avoid future failures by the first processor; and
    restoring the first processor by the second processor.

2. A method as defined in claim 1, wherein detecting the failure associated with the first processor comprises detecting a hang condition in response to the first processor executing one of a task to test a memory or a task to initialize hardware associated with the multiple-processor system.

3. A method as defined in claim 1, wherein detecting the failure associated with the first processor comprises detecting a hang condition associated with an auxiliary processor in response to the auxiliary processor executing an initialization task requested by a boot strap processor.

4. A method as defined in claim 1, wherein detecting the failure associated with the first processor comprises detecting a hang condition in response to a failure to receive a completion signal associated with the initialization task from the first processor.

5. A method as defined in claim 1, wherein detecting the hang condition associated with the first processor comprises detecting a hang condition in response to a failure to receive a completion signal associated with the initialization task from the first processor within a time period.

6. A method as defined in claim 1, wherein restoring the first processor comprises transmitting a reset signal to the first processor from the second processor.

7. A multiple-processor system comprising:
    a first processor to execute an initialization task during initialization of the multiple-processor system;
    a second processor in communication with the first processor, the second processor to detect a failure associated with the first processor and caused by the initialization task, to restore the first processor, and to identify the initialization task that caused the failure associated with the first processor; and
    a list to which the initialization task is added to avoid future failures by the first processor.

8. A processor system as defined in claim 7, wherein the first processor comprises an auxiliary processor, and wherein the second processor comprises a boot strap processor.

9. A processor system as defined in claim 7, wherein the first processor is to execute one of a task to test a memory or a task to initialize hardware associated with the processor system.

10. A processor system as defined in claim 7, wherein the second processor is to detect a hang condition in response to the first processor executing an initialization task assigned by the second processor.

11. A processor system as defined in claim 7, wherein the second processor is to detect the failure associated with the first processor in response to a failure to receive a completion signal associated with the initialization task from the first processor.

12. A processor system as defined in claim 7, wherein the second processor is to detect the failure associated with the first condition in response to a failure to receive a completion signal associated with the initialization task from the first processor within a time period.

13. A processor system as defined in claim 7, wherein the second processor is to transmit a reset signal to the first processor.

14. A machine readable medium storing instructions, which when executed, cause a machine to:
    detect a failure associated with a first processor of a plurality of processors in a multiple-processor system during initialization of the multiple-processor system;
    identify an initialization task that caused the failure associated with the first processor by a second processor;
    add the initialization task to a list to avoid future failures by the first processor; and
    restore the first processor.

15. A machine readable medium as defined in claim 14, wherein the instructions cause the machine to detect the failure associated with the first processor by detecting a hang condition associated with the first processor in response to the first processor executing the initialization task to initialize the multiple-processor system.

16. A machine readable medium as defined in claim 14, wherein the instructions cause the machine to detect the failure associated with the first processor by detecting a hang condition associated with an auxiliary processor in response to the auxiliary processor executing an initialization task requested by a boot strap processor.

17. A machine readable medium as defined in claim 14, wherein the instructions cause the machine to detect the failure associated with the first processor by detecting a failure to receive a completion signal associated with the initialization task from the first processor.

18. A machine readable medium as defined in claim 14, wherein the instructions cause the machine to detect the failure associated with the first processor by detecting a failure to receive a completion signal associated with the initialization task from the first processor within a time period.

19. A machine readable medium as defined in claim 14, wherein the instructions cause the machine to restore the first processor by transmitting a reset signal to the first processor.

20. A machine readable medium as defined in claim 14 is one of a programmable gate array, application specific integrated circuit, erasable programmable read only memory, read only memory, random access memory, magnetic media, or optical media.

21. A multiple-processor system comprising:
a dynamic random memory (DRAM);
a first processor operatively coupled to the DRAM, the first processor to execute an initialization task during initialization of the multiple-processor system;
a second processor operatively coupled to the DRAM and the first processor, the second processor to detect a failure associated with the first processor and the initialization task, to restore the first processor, and to identify the initialization task that caused the failure associated with the first processor; and
a list to which the initialization task is added to avoid future failures by the first processor.

22. A processor system as defined in claim 21, wherein the first processor comprises an auxiliary processor, and wherein the second processor comprises a boot strap processor.

23. A processor system as defined in claim 21, wherein the first processor is to execute one of a task to test a memory or a task to initialize hardware associated with the multiple-processor system.

24. A processor system as defined in claim 21, wherein the second processor is to detect a hang condition in response to a failure to receive a completion signal associated with the initialization task from the first processor.

25. A processor system as defined in claim 21, wherein the second processor is to detect a hang condition in response to a failure to receive a completion signal associated with the initialization task from the first processor within a time period.

26. A processor system as defined in claim 21, wherein the second processor is to transmit a reset signal to the first processor.

27. A method to reinitiate failed processors in multiple-processor systems, the method comprising:
dispatching a request associated with an initialization task to a first processor of a plurality of processors in the multiple-processor system from a second processor of the plurality of processors, the first processor to execute the initialization task;
detecting a failure associated with the first processor by the second processor;
restoring the first processor by the second processor;
identifying the initialization task that caused the failure associated with the first processor by the second processor; and
adding the initialization task to a list to avoid future failure by the first processor.

28. A method as defined in claim 27, wherein dispatching the request associated with the initialization task comprises dispatching a request associated with one of a task to test a memory or a task to initialize hardware associated with the multiple-processor system.

29. A method as defined in claim 27, wherein dispatching the request associated with the initialization task comprises dispatching a request associated with an initialization task to an auxiliary processor from a boot strap processor.

30. A method as defined in claim 27, wherein detecting the failure associated with the first processor comprises detecting a hang condition associated with an auxiliary processor in response to the auxiliary processor executing an initialization task requested by a boot strap processor.

31. A method as defined in claim 27, wherein detecting the failure associated with the first processor comprises detecting a hang condition in response to a failure to receive a completion signal associated with the initialization task from the first processor.

32. A method as defined in claim 27, wherein detecting the failure associated with the first processor comprises detecting a hang condition in response to a failure to receive a completion signal associated with the initialization task from the first processor within a time period.

33. A method as defined in claim 27 further comprises bypassing the initialization task that caused the failure associated with the first processor.

34. A method as defined in claim 27 further comprises testing the first processor for hardware failure.

* * * * *